United States Patent
Dobbins et al.

(10) Patent No.: US 10,584,515 B2
(45) Date of Patent: Mar. 10, 2020

(54) ELECTRONIC LOCK FOR SAFES (71) Applicant: Ellenby Technologies, Inc., Woodbury Heights, NJ (US)

(72) Inventors: Aaron H. Dobbins, Cherry Hill, NJ (US); Bob M. Dobbins, Villanova, PA (US); James Henry, Marlton, NJ (US)

(73) Assignee: ELLENBY TECHNOLOGIES, INC., Woodbury Heights, NJ (US)

( * ) Notice: Subject to any disclaimer, the term of this patent is extended or adjusted under 35 U.S.C. 154(b) by 253 days.

(21) Appl. No.: 15/696,371

(22) Filed: Sep. 6, 2017

(65) Prior Publication Data

US 2018/0066453 A1 Mar. 8, 2018

Related U.S. Application Data (60) Provisional application No. 62/383,936, filed on Sep. 6, 2016.

(51) Int. Cl.
| | | |
|---|---|---|
| *E05B 63/24* | (2006.01) | |
| *E05B 15/02* | (2006.01) | |
| *E05G 1/04* | (2006.01) | |
| *E05B 47/06* | (2006.01) | |
| *E05B 65/00* | (2006.01) | |

(Continued)

(52) U.S. Cl.
CPC ............ *E05B 63/24* (2013.01); *E05B 15/022* (2013.01); *E05B 17/2007* (2013.01); *E05B 17/2038* (2013.01); *E05B 47/0603* (2013.01); *E05B 65/0075* (2013.01); *E05G 1/04* (2013.01); *G01D 5/342* (2013.01); *E05B 47/0012* (2013.01);

(Continued)

(58) Field of Classification Search
CPC ... E05G 1/00; E05G 1/04; E05B 15/02; E05B 15/0205; E05B 15/022; E05B 15/024; E05B 17/20; E05B 17/2007; E05B 17/203; E05B 17/2038; E05B 17/22; E05B 2047/0069; E05B 47/0046; E05B 47/06; E05B 47/0603; E05B 47/0696; E05B 63/24; E05B 63/244; E05B 63/248
See application file for complete search history.

(56) References Cited

U.S. PATENT DOCUMENTS

| | | | |
|---|---|---|---|
| 1,768,021 | A | 6/1930 | Bauerband |
| 2,171,263 | A | 8/1939 | Bremer |

(Continued)

FOREIGN PATENT DOCUMENTS

| | | |
|---|---|---|
| EP | 0287686 A1 | 10/1988 |
| WO | 2008041908 A1 | 4/2008 |

OTHER PUBLICATIONS

Collings English Dictionary—Complete and Unabridged, "Safe (n.d.)—a strong container, usually of metal and provide with a secure lock, for storing money or valuables", 2014 Page(s) http://www.thefreedictionary.com/safe, vol. 12th Edition.

*Primary Examiner* — Christopher J Boswell
(74) *Attorney, Agent, or Firm* — Hultquist, PLLC; Peter H. Priest (57) ABSTRACT

An electronic lock with an electronic sensing arrangement to accurately sense relative positions of a bolt which mechanically locks a door, such as a door of an electronic drop safe, and to also sense an electronically controlled plunger which locks the bolt in place. The arrangement provides a mechanism for sensing a variety of mechanical malfunctions, as well as, potential fraud or tampering situations.

17 Claims, 9 Drawing Sheets

(51) Int. Cl.
  *G01D 5/34*   (2006.01)
  *E05B 17/20*  (2006.01)
  *E05B 47/00*  (2006.01)

(52) U.S. Cl.
  CPC ............ *E05B 2047/0016* (2013.01); *E05B 2047/0069* (2013.01)

(56) References Cited

U.S. PATENT DOCUMENTS

| | | |
|---|---|---|
| 2,786,701 A | 3/1957 | Povlich |
| 3,758,142 A | 9/1973 | Gartner |
| 3,919,869 A | 11/1975 | Fromm |
| 4,145,978 A | 3/1979 | Johnson et al. |
| 4,534,192 A | 8/1985 | Harshbarger et al. |
| 4,563,886 A | 1/1986 | Kletzmaier et al. |
| 4,593,543 A | 6/1986 | Stefanek |
| 4,866,963 A | 9/1989 | Leininger et al. |
| 5,153,561 A | 10/1992 | Johnson |
| 5,161,396 A | 11/1992 | Loeff |
| 5,584,517 A | 12/1996 | Simnacher et al. |
| H1766 H | 1/1999 | Horton |
| 6,098,433 A | 8/2000 | Maniaci |
| 6,345,522 B1 | 2/2002 | Stillwagon et al. |
| 7,296,830 B2 * | 11/2007 | Koveal ............... E05B 47/0012 292/201 |
| 7,445,255 B2 * | 11/2008 | Nye-Hingston .... E05B 15/0205 292/144 |
| 7,516,832 B2 | 4/2009 | Dobbins |
| 7,779,983 B2 | 8/2010 | Dobbins |
| 8,770,372 B2 | 7/2014 | Dobbins et al. |
| 8,854,180 B2 * | 10/2014 | Bacarella ............. E05B 47/026 340/5.6 |
| 9,157,261 B2 * | 10/2015 | Rahilly ................ E05B 65/46 |
| 9,404,287 B2 * | 8/2016 | Lepie .................... E05B 43/00 |
| 9,523,215 B2 * | 12/2016 | Denison .............. E05B 17/0029 |
| 9,810,000 B2 * | 11/2017 | Schroeder ........... E05B 47/0004 |
| 2002/0063034 A1 | 5/2002 | Dobbins |
| 2004/0046018 A1 | 3/2004 | Dobbins |
| 2011/0011927 A1 | 1/2011 | Dobbins |
| 2011/0084506 A1 * | 4/2011 | Roatis ................ E05B 17/0029 292/240 |
| 2011/0175730 A1 | 7/2011 | Stevenson |
| 2011/0225433 A1 | 9/2011 | Wan |
| 2011/0279225 A1 | 11/2011 | Frontino et al. |
| 2014/0182342 A1 * | 7/2014 | Kleiner ................ E05B 15/022 70/93 |
| 2016/0110939 A1 | 4/2016 | Dobbins et al. |
| 2018/0371800 A1 * | 12/2018 | McDonald ............. E05B 65/00 |
| 2019/0178014 A1 * | 6/2019 | Gerasimov ........... E05B 47/026 |

* cited by examiner

ELECTRONIC LOCK FOR SAFES

CROSS REFERENCE TO RELATED APPLICATION

The present application claims the benefit of U.S. Provisional Patent Application Ser. No. 62/383,936 filed Sep. 6, 2016 entitled "Electronic Lock for Safes" which is incorporated by reference herein in its entirety.

FIELD OF THE INVENTION

The present invention relates generally to improved electronic locks, and more particularly to electronic locks and sensing techniques to confirm their proper operation adapted to electronic drop safes and the like.

BACKGROUND OF THE INVENTION

Electronic locks are a popular feature of modern safes and strong boxes for several reasons. First, they enable the use of advanced authentication methods including PIN codes, biometric sensors such as fingerprint, palm, or retina scanning, programmed time of day unlocking, or some combination of the above. Second, the use of an electronic lock facilitates the creation of electronic records of opening the lock. Third, unlock codes can be added or modified without the expense of recoding a lock cylinder or cutting new keys as required with mechanical key locks. Fourth, electronic locks can be monitored or actuated remotely if a networking connection is provided.

For their many desirable features, some electronic locks have some drawbacks. Locks designed for safes are most frequently installed inside the bolt work within the safe door as taught, for example, by Maniaci U.S. Pat. No. 6,098,433 and Bremer U.S. Pat. No. 2,171,263. Such placement often leads to having a power source and a controller within the door or wiring a harness over to the door across a moving door hinge boundary.

Gartner U.S. Pat. No. 3,758,142 offers a lock configuration where the electronic locking element is located on the wall side of a safe which serves as an example of how wiring can be avoided across a door hinge boundary. Gartner further addresses another drawback of many electronic safe locks in that they lack assurance that they have effectively locked the safe door in place. Gartner teaches that a lock may include indicating means such as a switch and a light for indicating that the cross bolt is in the locked position to detect false locking. The disclosed mechanical switch arrangement requires a generous volume of working space behind the door sill area of the safe and relies on special features within the cross bolt mechanism to actuate the switch plunger. In Gartner's described configuration, both the cross bolt and the switch plunger may be subjected to physical wear over time resulting in a loss of affirmative lock feedback. Additionally, in Gartner's arrangement, the system has limited ability to automatically manage false latching conditions as the user is required to manually insert a key to force the solenoid to re-energize to once again retract the cross bolt.

It is known in the industry that the driving action of a bolt can be used to trigger a locking mechanism mechanically as exemplified by Gartner. To do so, spring loaded latching mechanisms such as the lever arm taught by Gartner or the spring leaf taught by Dobbins U.S. Patent Application Publication No. 2016/0110939, assigned to the assignee of the present application and incorporated by reference herein in its entirety, are actuated by the bolt to release a plunger mechanism that grabs the bolt in a locked state. These types of mechanical actuation systems may require careful attention to mechanical tolerances of the bolt which is mounted to a sliding or swinging door, with respect to a fixed wall. Typically, these types of tolerances are difficult to control and result in requiring generous over-travel of the bolt or sizeable actuation levers that consume large volumes of space internal to the product.

Electronic bolt position sensing at the wall of the safe advantageously serves as a way of detecting when the door itself is in the fully closed and lockable position. One traditional approach to monitoring whether a door is open or closed is by using a door switch such as a mechanical plunger style switch or a magnetic switch such as a reed switch. A controller is configured to sense when the face or edge of the door contacts or nearly contacts the switching element to indicate the door is closed. One difficulty with such systems is that there is a window of uncertainty as to whether the door is actually closed. In the case of a magnetic switch, both the door mounted magnetic field strength and the reed switch sensitivity levels may not be well controlled. The door switch may register that the door is closed even when it is partially open such that the sensor and magnet are close enough to trigger the switch. In the case of a mechanical door switch, mechanical bracketry and the switch plungers themselves are subject to being bent or otherwise deformed over repeated use that can result in malfunctions. An added drawback to the above described door sensing methods is that they are subject to attach by using a piece of tape across the door switch plunger or a magnet near the reed switch.

SUMMARY OF INVENTION

One aspect of the present invention is the recognition that electronic sensing of a bolt using a non-contact sensing arrangement may advantageously reduce requirements of tight mechanical tolerance of mechanical actuated sensing.

By contrast with traditional door sensing described above, electronically monitoring for the presence of the bolt to enter a lock channel in the side wall of a safe gives complete assurance that the door is closed and not partially open and is significantly more robust to malicious attempts to defeat the door sensing mechanism as addressed further herein.

It is an objective of one aspect of this invention to provide an improved electronic lock assembly for safes that is wall mounted on the body of the safe and can detect and indicate to a host controller if the bolt of a safe door has been properly captured.

Another objective of an aspect of the invention is to provide an optical sensing arrangement with a lock assembly that can sense the moment a door is closed and lockable by monitoring the position of the door bolt.

Another objective of one aspect of the invention is to employ a lock controller in conjunction with sensors within the lock assembly to decide when to extend a plunger to trap the door bolt in the locked position.

Yet, another objective of an aspect of the invention is to employ a lock controller that can monitor sensors within the lock assembly and determine if the plunger has properly engaged with the door bolt to ensure the door is locked.

Another objective is to provide a mechanical arrangement whereby the electronic lock plunger is sized to fit inside a bolt capture channel to prevent attempts to force the bolt away from the capture channel when in the locked state.

Another objective is to provide a technique to monitor ambient light near the door lock for the purpose of detecting a break in attempt.

Another objective is to disclose a method to eliminate the possibility of room lighting being falsely mistaken as sensing the presence or absence of the door bolt.

Another objective is to provide a method of door sensing that is robust against attempted cheats and tampering.

Another objective is to disclose a method of automatically determining whether to lock or unlock a door based on sensor information indicating the position of the bolt and plunger, and from information from the user interface.

Another objective is to disclose an electronic lock assembly that combines door close sensing with motorized lock control.

It will be recognized that the claims define the scope and coverage of any given invention and that one or more claims may achieve none, one, or more than one of the above listed exemplary objectives without departing from the scope of the present invention.

A more complete understanding of the present invention, as well as further features and advantages of the invention, will be apparent from the following Detailed Description and the accompanying drawings.

DETAILED DESCRIPTION

Figure 1:
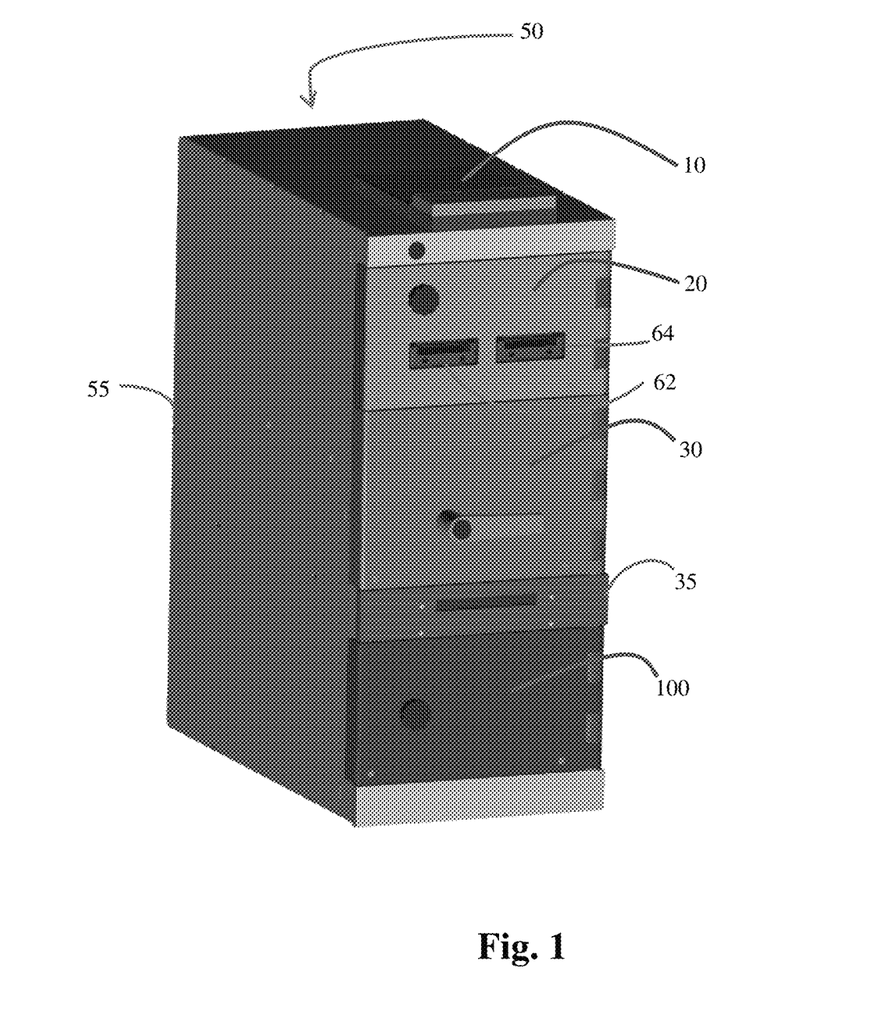
FIG. 1 shows a combination of a smart safe and electronic locks in accordance with an embodiment of the present invention.

Referring to FIG. 1, an electronic safe 50 is shown including a safe housing 55, safe top door 20, safe center door 30 and safe bottom door 100. The electronic safe 50 also has a user keypad and display module or interface 10 for users to enter their identification and other information as well as receive messages from the safe system. Further details of electronic safes and coin and bill dispensing safes with which the present invention may be advantageously employed are found in U.S. Patent Application Publication Nos. 2002/0063034; 2004/0046018; 2011/0279225; 2011/0011927; and U.S. Pat. Nos. 7,516,832; 7,779,983; and 8,770,372, all of which are assigned to the assignee of the present invention and incorporated by reference herein in their entirety.

In one embodiment, the electronic safe 50 houses electronic bill acceptors, 62 and 64, to allow bills to be deposited into the safe. The electronic safe will record the identity of the person depositing the bills as well as keep track of all currency in the safe. The safe also has an envelope drop slot 35 which may be configured with an electronically controlled door to allow for drops of bills and other items that cannot be accepted by the bill acceptors 62 and 64.

The electronic safe as shown in FIG. 1 contains three doors. The top door 20 is used to allow access by service personnel to the bill acceptors 62 and 64 and other electronics. This door can be supplied with a key lock or with only an electronic lock to be discussed further below or with both a key lock and an electronic lock. If an electronic lock is used, a required code to unlock the door may be entered through the keypad of keypad and display module 10.

The center door 30 is used to house the bill cassettes associated with the bill acceptors 62 and 64. This door may also include a key lock. The center door can be supplied with a key lock or with only an electronic lock to be discussed below or with both a key lock and an electronic lock. If an electronic lock is used, the required code to unlock the door may be entered through the keypad.

The bottom door 100 is used to access the envelopes dropped through the envelope drop slot 35. Similar to the top and center doors 20 and 30, if an electronic lock is used, in one embodiment, the bottom door 100 will require a code to be entered through the keypad to open. Alternatively, a code might be transmitted from an authorized user's identification badge or tag, an authorized user's cellphone, or the like.

Figure 2:
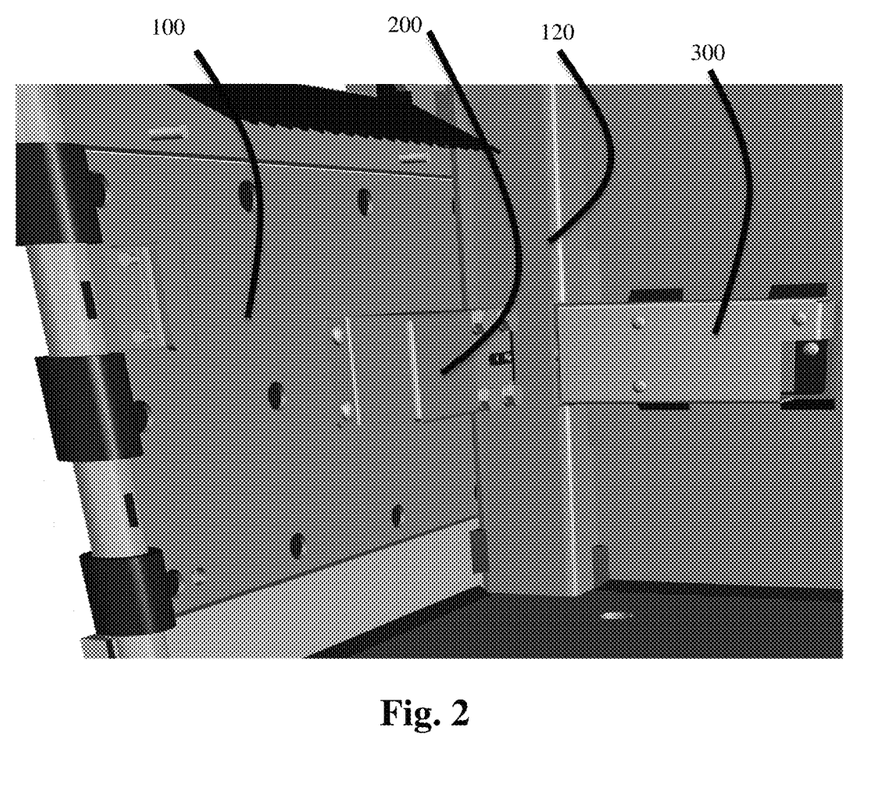
FIG. 2 shows an internal cutaway view of a sidewall and door of the smart safe of FIG. 1 providing an overall view of an electronic lock configuration in accordance with the present invention.
Figure 3:
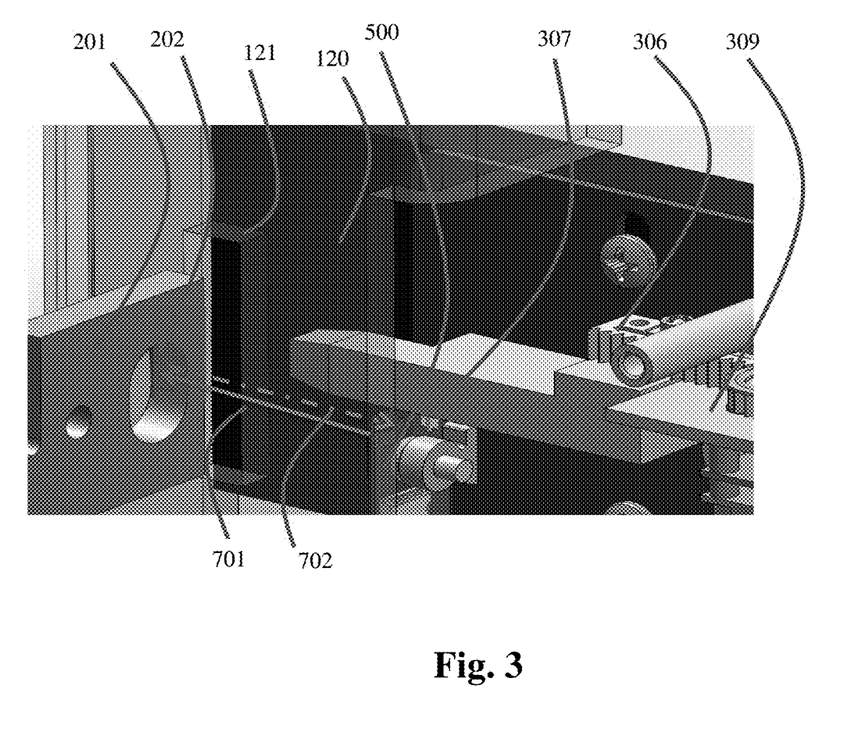
FIG. 3 illustrates internal details of the electronic lock of FIG. 2 with the bolt of the electronic lock outside a bolt capture channel.

The mechanical arrangement of components relating to various electronic lock related aspects of the present invention can be best understood with reference to FIGS. 2-9. In a first aspect of this invention, a door mounted bolt 201 (FIG. 3) is automatically captured by a wall mounted electronic lock 300 (FIG. 2). As further seen in FIG. 2, bolt mechanism 200 is mounted on the inside surface of safe door 100 and is configured to extend into a bolt capture channel 120 when the door is shut. The bolt capture channel 120 may suitably comprise a metal channel built on a sidewall of the safe with an opening for the movable bolt to enter in a first movable bolt position. When the bolt enters the channel 120, a bolt detection sensor 501 (FIG. 4) detects the presence of the bolt and sends a detection signal to an electronic lock control board 400.

Figure 7:
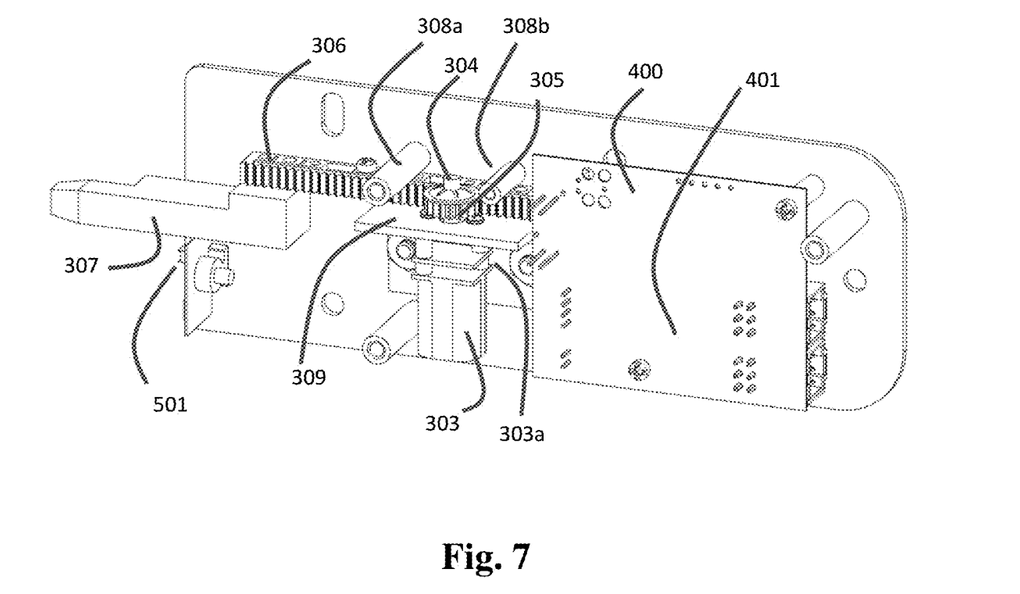
FIG. 7 shows the electronic lock assembly of FIG. 2 without its cover plate.

The controller 401, upon receiving an indication from the bolt detection sensor 501, initiates a control signal to motor driver 402 to drive motor 303 to spin in a forward direction. The output shaft of the motor 304 is rigidly coupled to a pinion gear 305 whose teeth are interlocked with a rack 306 as seen in FIG. 7. In this arrangement, a forward spin direction of the motor output shaft 304 results in a linear motion driving the rack 306 in the direction of the safe door 100 of FIG. 1.

The rack 306 is coupled to a plunger 307 configured to fit through a hole 202 in the center of the bolt 201 when fully extended in the forward position. In a presently preferred embodiment, motor 303 has a gearbox 303A coupled to it to increase the available torque from the output shaft 304. The motor assembly may optionally include a clutch mechanism to prevent damage to the gear teeth.

Figure 5:
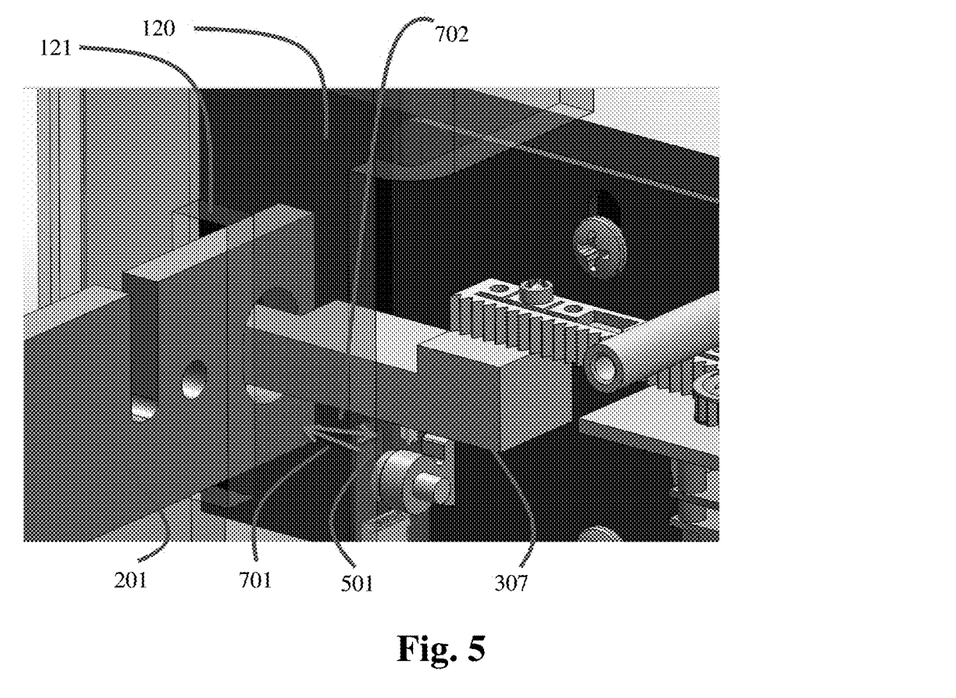
FIG. 5 shows the bolt of FIG. 3 inside the capture channel and locked in place by a controllable plunger.
Figure 9:
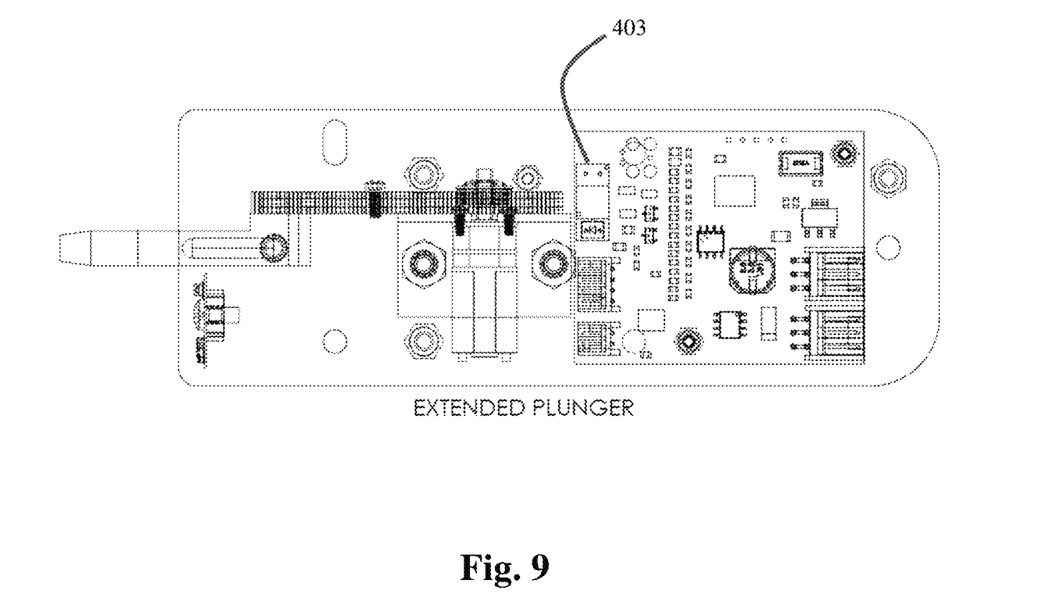
FIG. 9 shows a top view of the electronic lock assembly with the plunger extended.

When the plunger 307 is fully extended, the bolt 201 is prevented from being retracted due to the mechanical interference between plunger 307 and a slot 121 in the bolt capture channel 120 as shown in FIGS. 5 and 9. In this fully extended position, sensor 403 detects that the rack is located at its extended position and provides the controller 401 with assurance that the plunger is fully extended. Rack sensing can be accomplished with a number of sensing technologies. For example, mechanical tactile switches can be arranged to be depressed by features on the rack or plunger assembly as it reaches fully extended or fully retracted positions. Alternatively, various non-contact sensing approaches can be used involving the use of magnetic field detection or optical detection, or using capacitive or inductive sensing methods as will be described in the context of bolt detecting sensors. A rack position sensor can be configured to detect only a single point in the travel of the plunger, such as when it is fully extended. Alternatively, multiple sensors can be configured to detect several points in the plunger's travel such as fully extended and fully retracted. It is also understood that fully variable position sensing techniques could be employed to more precisely capture the plunger position. One such technique involves the use of an optical encoder wheel on the motor to sense how many turns of the motor have transpired. A second method would be having the plunger/rack assembly capture the arm of a linear slide potentiometer. As illustrated, sensor 403 is a transmissive IR sensor positioned on control board 400 such that the rack allows light to pass from a emitter element to a receiver element when the rack is extended, but blocks light from the emitter from reaching the receiver when the rack is not extended.

In accordance with an aspect of the present invention, when a user desires to unlock safe door 100, they first must present proper credentials to the safe interface 10. These credentials are preferably in the form of an access code, but it is recognized that a variety of biometric or key means including a fingerprint reader, palm print reader, key switch, Dallas key, RFID tag, or some combination thereof may be employed. Also, access restrictions to particular users and particular times and dates may be employed.

Figure 4:
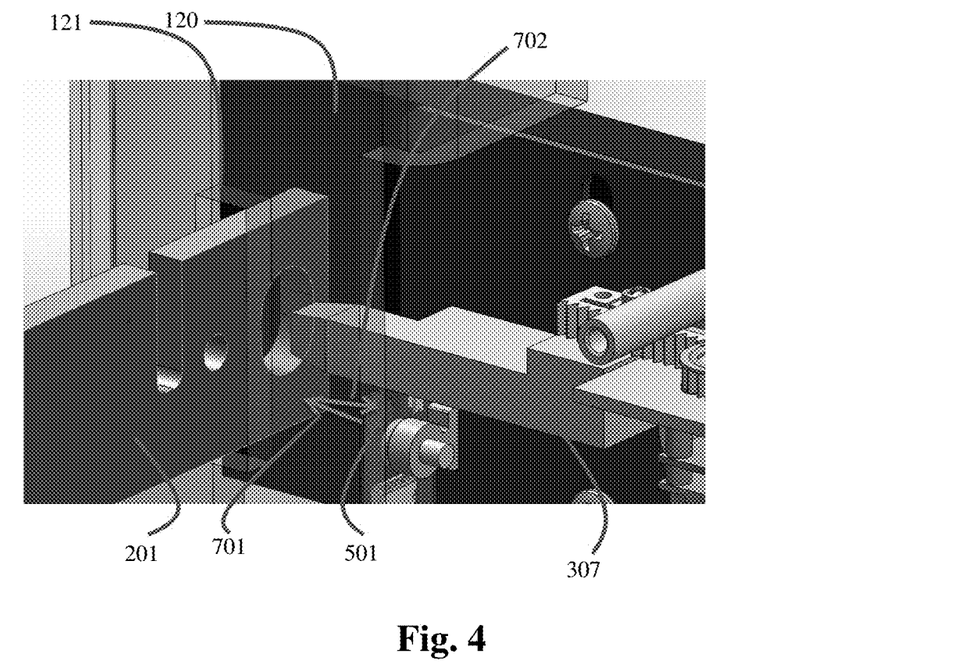
FIG. 4 shows the bolt of FIG. 3 mounted inside the bolt capture channel and unlocked.
Figure 8:
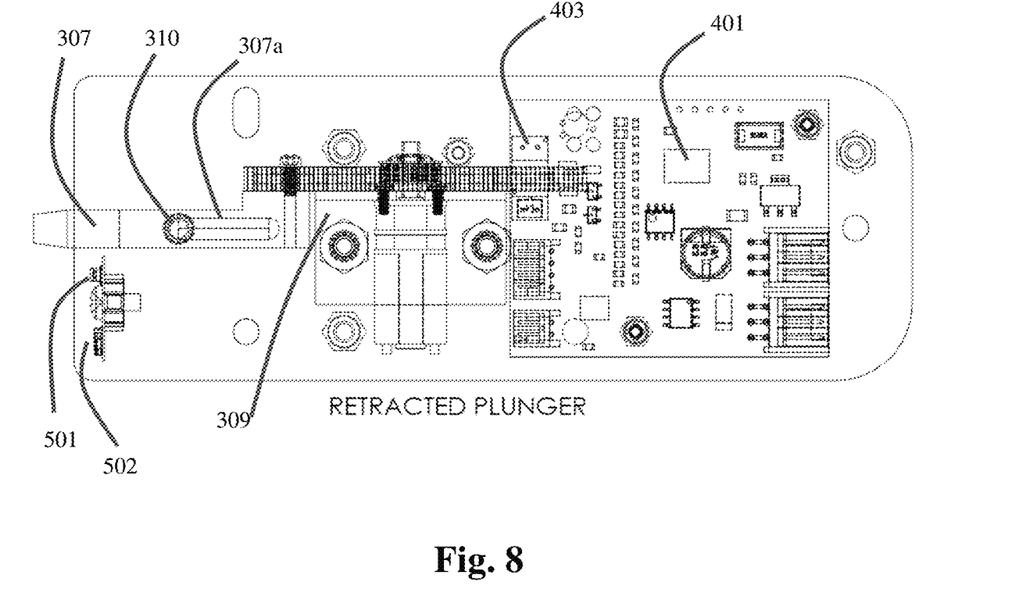
FIG. 8 shows a top view of the electronic lock assembly with the plunger in retracted position.

Once authenticated, the lock controller 401 generates a control signal to the motor driver 402 to drive motor 303 to spin in a backward direction. This backward spin forces linear motion of the plunger in the direction away from the safe door 100. Once the plunger pulls clear of bolt 201, the bolt is free to retract allowing the door to open as shown in FIGS. 4 and 8.

Linear motion of the rack's plunger assembly is guided by a set of posts 308a and 308b as well as angle bracket 309. The plunger may also be guided by riding on a third post 310 captured by a slot within the body of the plunger 307a.

Figure 6:
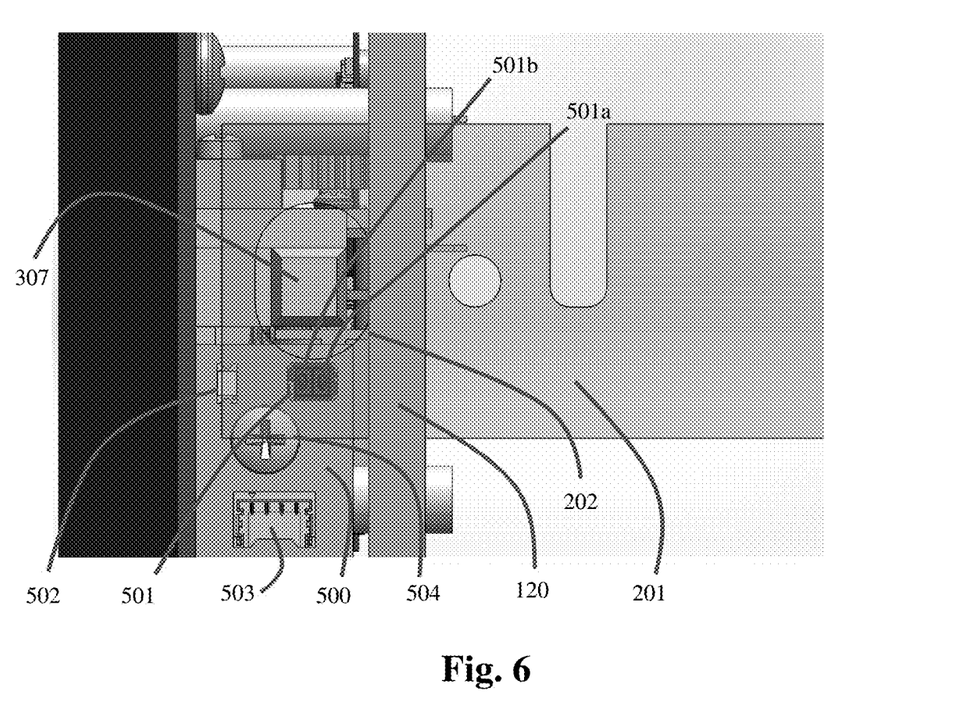
FIG. 6 shows a side view of the engaged bolt of FIG. 5.
Figure 10:
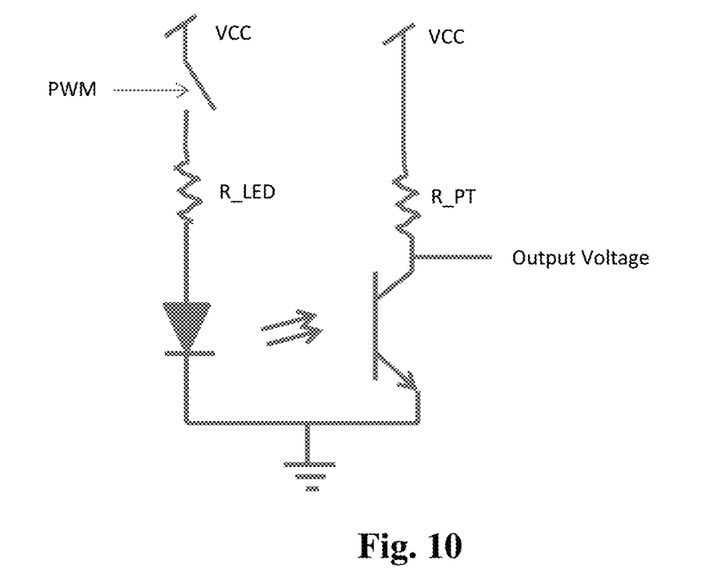
FIG. 10 shows an exemplary bolt detection sensor.

It is currently preferred to have the lock controller lock the safe door whenever the door is closed to ensure the contents inside are secured. The controller 401 therefore monitors the bolt sensor 501 signal for the presence of a bolt within the lock channel. Sensing of the bolt can be accomplished by a number of sensing methods. For example, the bolt sensor may be a magnetic reed switch or Hall sensor arranged to detect a magnetic material within the bolt. The sensor could also be an inductive or capacitive sensor configured to detect the presence of a nearby metal bolt once the bolt is extended. Alternatively, the bolt sensor may be as simple as a mechanical contact switch configured to actuate when the bolt is extended. The sensor can also be a non-contact optical sensor that uses either visible or invisible light to bounce off the bolt in a reflective mode or pass through the area in which the bolt will travel and therefore be blocked by the presence of the bolt in a transmissive mode. As shown in FIG. 10, the bolt sensor 501 is a reflective infrared (RIR) type sensor. The sensor's infrared emitter 501a sends light 701 in a direction perpendicular to the surface of the board and the sensor's receiver 501b senses the magnitude of the returned IR light 702 that reflects off nearby objects. When the bolt enters the lock capture channel, the IR light reflects off the body of the bolt back to the sensor where the controller registers the presence of the bolt as seen in FIG. 6. Note that in the illustrated embodiment, the output voltage of FIG. 10 is followed by a comparator circuit to generate a binary signal for the lock controller to interpret. In an alternate embodiment, the lock controller 401 can analyze the receiver's output voltage directly through the use of an analog to digital converter.

Infrared sensors such as these are typically at least partially sensitive to visible light which includes a component of infrared even when using visible light blocking lenses. This sensitivity can result in false signals indicating the presence of a bolt. To avoid confusing ambient room light for a bolt reflecting the infrared light from the emitter, the emitter light is pulse width modulated. The controller therefore looks to detect only properly pulse width modulated light to indicate the presence of a bolt.

Figure 11:
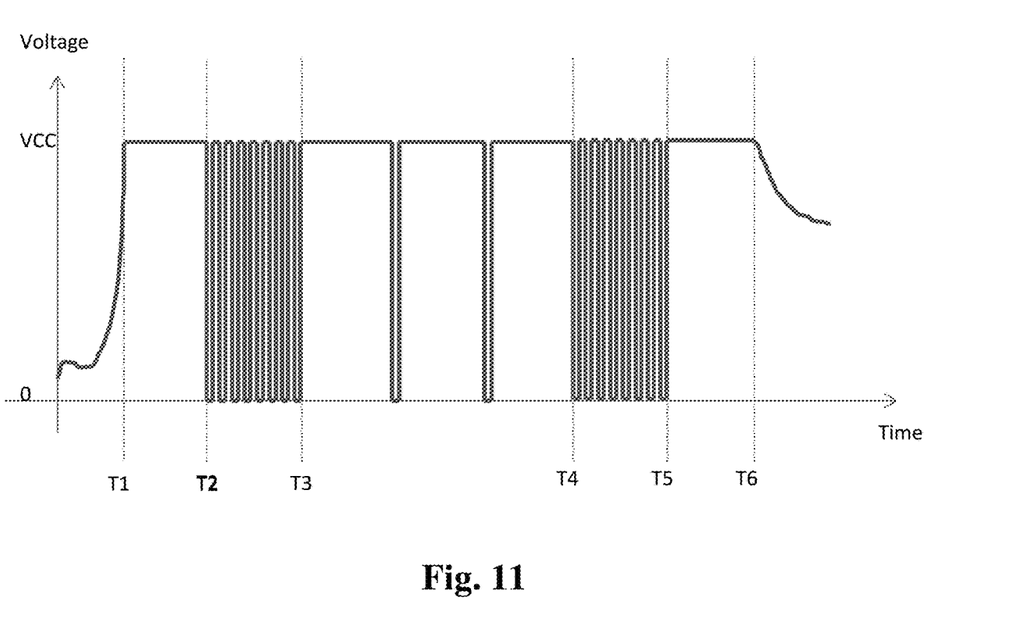
FIG. 11 shows a bolt detection waveform illustrating sensed voltage during a proper door close, door lock, door unlock, and door open sequence.
Figure 12:
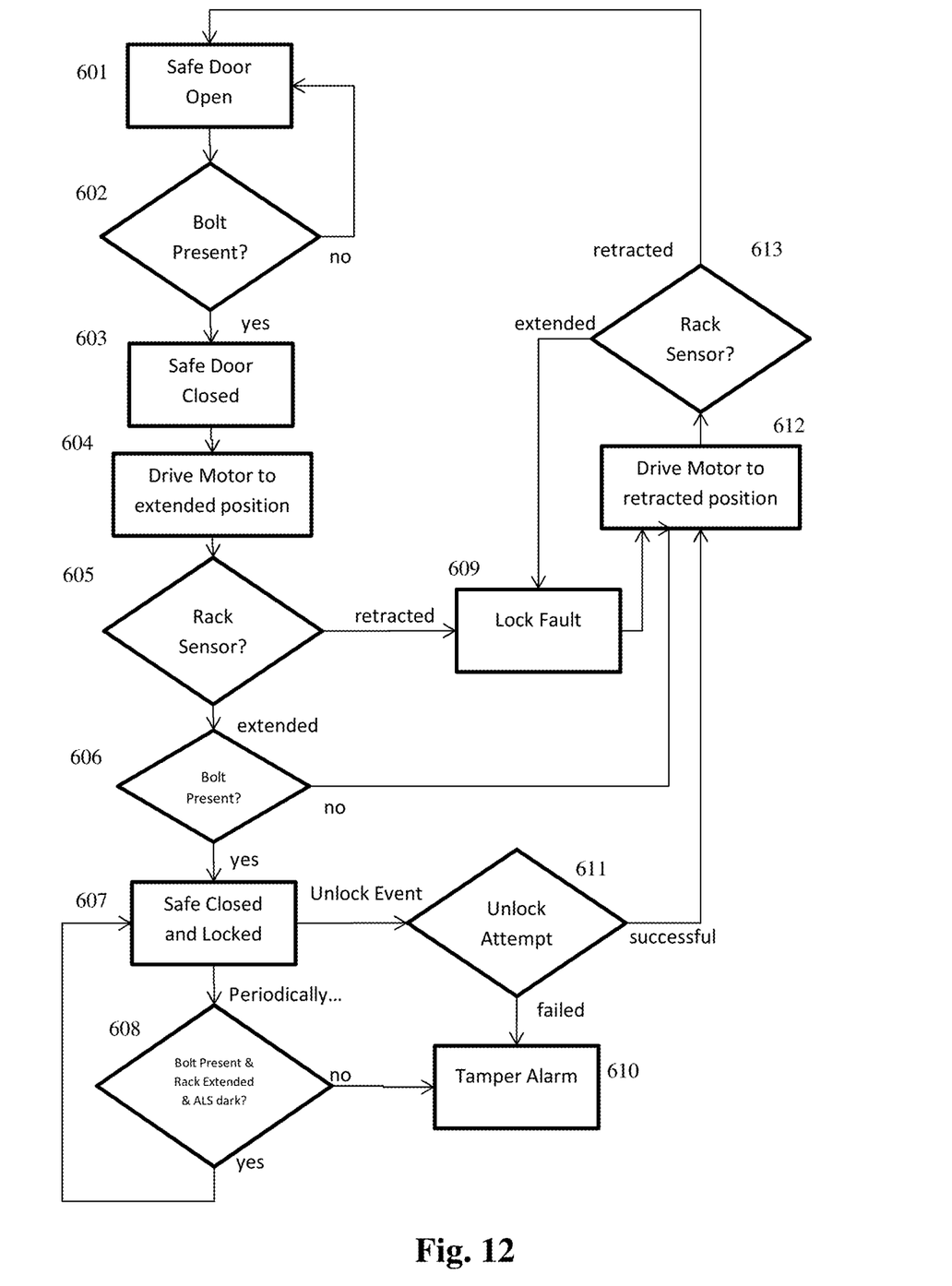
FIG. 12 shows a process for electronic lock operation sensing in accordance with the present invention.
Figure 13:
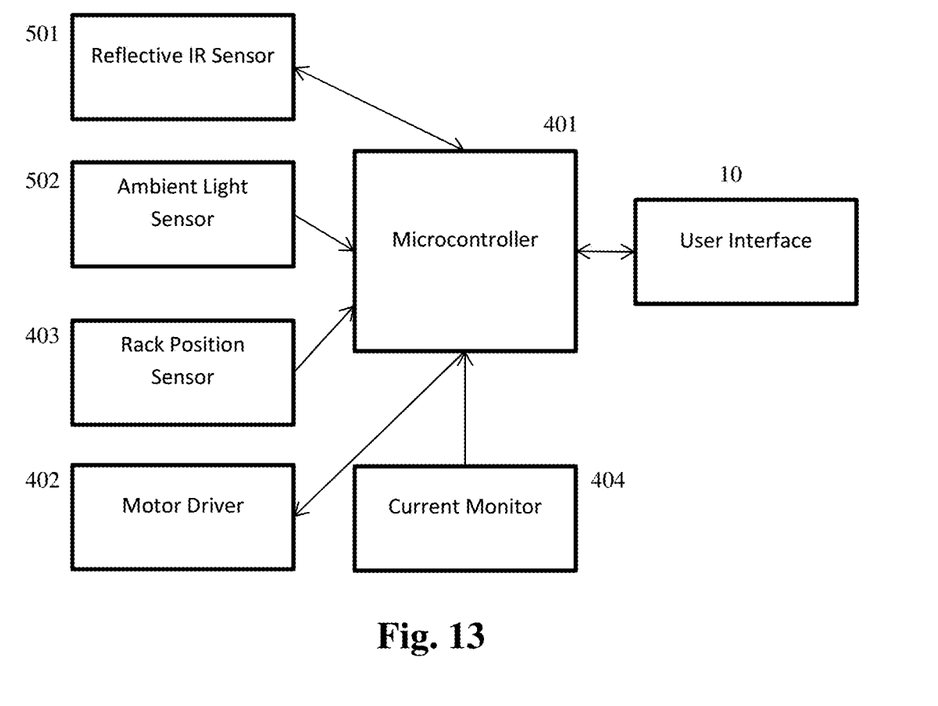
FIG. 13 shows controller and sensor block diagram for control processing in accordance with the present invention.

The above described approach to bolt detection can be better understood with the aid of the timing diagram shown in FIG. 11 and the flow chart of FIG. 12. Before time T1, the door 100 of the safe is open. Ambient light from the room may enter the sensor's receiver input which is preferably a phototransistor that has a visible light blocking lens. Sunlight, incandescent lighting, and other artificial room light sources have some amount of light emission in the infrared part of the spectrum. As a result, those ambient light sources may fall onto the phototransistor and generate a resulting light detecting signal absent the pulse width modulation (PWM) detection approach of the present invention.

In the presently preferred arrangement, the phototransistor has its emitter leg tied to ground and a pull-up resistor on the collector. Incident IR radiation causes the output voltage to dip low with respect to the supply rail, VCC. During this period of time, the lock controller is in state 601 and actively monitoring for a bolt present signal.

At time T1, the safe door is closed. The door blocks ambient light from entering the bolt capture channel and the resulting measured voltage signal goes to VCC indicating the absence of detected light. The controller is still in state 601 since bolt presence check 602 continues to fail.

At time T2, the bolt engages with the bolt capture channel to the point where the light from the emitter bounces off the metal bolt and reflects back to the phototransistor. Because the light from the emitter is pulsed, the received light in the phototransistor is a square wave at the PWM frequency and duty cycle. The frequency is preferably 1 kHz and the duty cycle is 50%. Whereas it is suitable to drive the emitter at a fixed frequency and duty cycle, it is also possible to vary either or both parameters in a planned or random pattern to add additional security. By varying or even randomizing either frequency or duty cycle, it is possible to eliminate the possibility of a fake bolt detection sensor signal being generated by an external light source employed by someone seeking to break into safe 50. Only the lock controller is aware of the IR LED driven frequency and duty cycle, and its algorithm aims to match the received voltage pattern from the phototransistor to its driven signal.

The lock controller analyzes the voltage output from the phototransistor for a period of time between T2 and T3 to determine that the signal received matches the profile of the transmitted signal into the LED emitter. At T3, a predetermined number of cycles of a received signal have been verified by the controller to ensure the bolt is properly in the capture channel in process step 603 and a motor control signal is generated to drive the plunger to engage with the hole in the bolt 202 in process step 604. The controller 401 monitors sensor 403 as previously discussed to ensure the plunger properly engages into the bolt hole in process step 605.

Once locked, the bolt cannot be removed and therefore there is no need for rapid sampling and analysis of the bolt detection signal once it is determined that the bolt is still present in step 606. The duty cycle of the PWM signal to the LED emitter can be dropped to a significantly lower level, such as a 500 us pulse every 5 seconds. This period of time from T3 to T4 continues while the door is closed and locked corresponding to process step 607 with periodic bolt checks 608.

At time T4, the safe is purposely commanded to unlock through some programmed means or by some authentication process in step 611. The controller adjusts the pulsed width modulated frequency back to a higher rate, preferably 1 kHz, to more rapidly monitor the bolt position to more precisely determine the moment the bolt is retracted. The motor is driven in the reverse direction to retract the plunger from the bolt in process step 612 allowing the bolt to be retracted from the bolt capture channel. Sensor 403 is monitored by the controller to determine the moment when the rack is in the retracted position in step 613 indicating the bolt should be free to be pulled from the channel.

At time T5, the bolt is retracted from the channel past the point where reflections of the emitter light bounce from the bolt's surface to arrive at the phototransistor. From T5 to T6, the reflected pulsed light is no longer seen as the bolt has been removed from the channel and the measured phototransistor's output voltage is VCC. The controller determines the absence of a received square wave of the phototransistor's output to be indicative of the door being opened.

At time T6, the safe door itself is swung open. This opening may allow for some amount of light from the room to fall upon the phototransistor within the frequency space where the phototransistor is sensitive and drive the transistor's output voltage low after time T6. Since the measured low output voltage is not pulse width modulated to the proper driving frequency of the LED emitter, this output low signal will not be confused for the presence of a bolt.

The above described sequence highlights proper behavior of locking and unlocking the safe door. There are scenarios where improper sequence steps that occur will be indicative of either tampering, undesired user interaction, or equipment malfunction. Appropriate monitoring for these conditions by the controller provides the ability to provide feedback to the user so the user can take corrective actions.

In a first scenario of improper sequence steps of tamper detection, the bolt may appear to be missing during an interval in time where it is assumed the door is closed and locked (between T3 and T4). If the bolt is forcibly removed, the IR light from the emitter portion of sensor 501 will not bounce off the bolt and make its way back to the phototransistor portion of 501 and the resulting monitored waveform will be a constant voltage at VCC. If this condition is detected by process step 608, then a tamper alarm can be asserted in step 610. Tampering can also be assumed if the measured IR light from the phototransistor does not match the profile of the sourced IR light into the RIR LED. This mismatch may be the case if an attempt is made to use an external visible or IR light source to fool the bolt detection sensor.

Tampering can also be detected by monitoring a secondary sensor 502 located on the sensor board 500 that is configured for measuring ambient light. When the door is closed and locked, the ambient light sensor should be in darkness. This sensor preferably is sensitive to a broader range of light wavelengths than the reflective IR phototransistor such that any visible or IR light incident on its surface will generate an output signal. Note that it is necessary to ignore data from the ALS while the IR LED signal is asserted from the reflective IR sensor due to its close proximity.

Another indication of lock tampering is evident if the rack sensor 403 no longer indicates the rack is extended when the door is otherwise assumed to be in the closed and locked position. This sensor feedback would be indicative, for example, of an attack on the plunger mechanism whereby the attacker is pressing the plunger forcefully to disengage it from the capturing the bolt by use of a member such as a finger, screwdriver, probe, or other type of instrument used to disengage the plunger from capturing the bolt.

Additionally, a tamper alarm can be set if disarm credentials of step 611 are passed to the controller incorrectly after one or more attempts.

In a second scenario of improper sequence steps of undesired user interaction, the user unlocks the door but neglects to open it. For a safe carrying valuables, as in FIG. 1, it is desirable to keep the safe locked when it is closed and not actively being used. If a safe is successfully unlocked but the door is not opened (in the interval from T4 to T5) then the controller will measure an output voltage from the phototransistor of sensor 501 that will remain PWM at nominally 1 kHz indicating the bolt is still engaged though it is no longer captured by the plunger in step 602. If the interval of time between T4 and T5 becomes excessively long, such as 10 seconds, due to user neglect, then the controller will proceed to reengage the lock by driving the motor forward once again.

Another form of undesirable user behavior is if after beginning the door lock sequence in step 604, the user turns the knob or door handle to retract the bolt the instant before the plunger catches the bolt. In this scenario, there are two potential outcomes. First is that the bolt is retracted entirely out of the channel. In this case, the square wave from the bolt present output signal will be missing sometime during the period between T2 and T3 and detected in step 606. In this scenario, the lock will be driven to the unlock position again. The user may be alerted to the unsuccessful door locking event on a user interface display, or by a tone, and a recorded misfired lock event may be reported to a network host.

A second potential outcome for a last moment bolt retraction by the user is for the bolt to be partially retracted such that the plunger does not properly pass through the bolt hole 201 but rather rests on a the surface of the bolt. In this scenario, the motor will be unable to drive the plunger all the way to the extended state. The resulting rack sensor will indicate the plunger is still retracted in step 605 and the system will enter a lock fault state 609. The automatic behavior of a lock fault will be to retract the plunger and wait for a door close event before attempting another lock sequence. Preferably, lock fault events are logged in the controller and after several lock faults within a window of time, such as three within a minute, the system will take the lock offline until service action is taken.

In a third scenario of improper sequence steps or equipment malfunction, the controller can sense jammed motors and misaligned bolt sensors. For jammed motors, the rack sensor feedback signal will never change and will remain in either the retracted or extended state. If when attempting to lock the safe door by extending the rack plunger assembly, the rack sensor output remains in the retracted state in step 605, a lock fault is registered in step 609. Similarly, if the motor is attempting to drive the lock open but the rack remains in the extended position when monitored in step 613, a lock fault is registered. As with the previous scenario of undesirable user operation, during a lock fault, the motor will attempt to drive the motor to the retracted position in step 612 such that the door can be opened to service the faulty hardware. After a few failed attempts, the controller will remain in the lock fault state 609.

Another type of equipment malfunction that can be detected by the controller is a missing bolt present signal. When this operation is applied to a smart safe, certain types of activities are only possible once a door is opened. One such activity is the removal of a cashbox. When one of the safe cashboxes is removed, an electronic signal is sent to the safe controller. If the safe controller also believes the door to be closed and locked due to the presence of a bolt detection signal, there is an indication of a mechanical malfunction. One explanation could be that something is stuffed in the bolt capture channel in the path of the reflective IR sensor. Another possibility is that the reflective IR sensor is bent such that its light is bouncing off a nearby safe wall. When such an anomalous event is detected, an indication can be sent to the user interface to prompt investigation.

It is also known that motor stall conditions can be determined from monitoring motor current. During a stall event, the current draw will increase often to two or three times that of normal drive currents. If a motor stall is detected within a duration of time that is too short to allow for full plunger extension or retraction, it is likely to be the result of a mechanical jam condition.

It will be clear that there are numerous configurations and embodiments possible using the technology and techniques described above. While the present invention is disclosed in the context of presently preferred embodiments, it will be recognized that a wide variety of implementations may be employed by persons of ordinary skill in the art consistent with the above discussion and the claims which follow below.

We claim:

1. A safe and electronic lock combination comprising:
A safe enclosure comprising a side wall and an access door;
an access door mounted bolt mechanism comprising a movable bolt moving parallel to the access door face to a first movable bolt position in which the movable bolt engages a bolt capture mechanism when the access door is properly closed;
an electronic controller; and
a side wall mounted electronic lock comprising a bolt position sensor assembly to sense the movable bolt in the first movable bolt position, a movable plunger having a first movable plunger position in which the movable plunger engages the movable bolt and secures the movable bolt in the first movable bolt position locking the access door, and a movable plunger position sensor assembly to sense the first movable plunger in the first movable plunger position.

2. The combination of claim 1 wherein the bolt position sensor further comprises:
a detector arranged to detect when the movable bolt moves to and from the first movable bolt position by directly monitoring the movable bolt.

3. The combination of claim 1 wherein the bolt position sensor assembly further comprises:
an infrared emitter arranged to transmit an infrared signal which is reflected by the movable bolt when the movable bolt is in the first movable bolt position, and an infrared detector detecting infrared signal reflected when the movable bolt is in the first movable bolt position, wherein the electronic controller pulse width modulates the infrared signal transmitted by the infrared emitter.

4. The combination of claim 1 wherein the bolt capture mechanism comprises:
a metal channel built on the side wall of the safe with an opening for the movable bolt to enter in the first moveable bolt position.

5. The combination of claim 1 wherein the electronic controller determines the movable bolt is in the first movable bolt position by detecting a pulse width modulated signal output by the bolt position sensor assembly.

6. The combination of claim 1 wherein upon determining the movable bolt is in the first movable bolt position, the electronic controller drives the driver to controllably move the movable plunger to engage the movable bolt.

7. The combination of claim 6 wherein the movable bolt further comprises an opening and the movable plunger engages the movable bolt by being driven into said opening.

8. An electronic lock and enclosure combination comprising:
an electronic lock configured to capture a movable bolt;
an enclosure enclosing the electronic lock;
a dual purpose movable bolt position sensor assembly sensing both a position of the movable bolt and an effort to tamper with the position of the movable bolt from outside the enclosure and producing sensor outputs; and
an electronic controller sensing positioning of the movable bolt and evaluating said sensor outputs to detect the effort to tamper with the position of the movable bolt from outside the enclosure.

9. The combination of claim 8 wherein the electronic lock further comprises a movable plunger that engages the movable bolt and secures the movable bolt in a first movable bolt position.

10. The combination of claim 9 wherein the effort to tamper with the position of the movable bolt comprises using a member to attempt to move the movable plunger so that the movable bolt will not be secured in the first movable bolt position.

11. An electronic lock and enclosure combination comprising:
an electronic lock having a movable plunger, the electronic lock configured to capture a movable bolt in a first position with the movable plunger;
an enclosure enclosing the electronic lock;
a dual purpose movable plunger position sensor assembly sensing both a position of the movable plunger and an effort to tamper with the position of the movable plunger from outside the enclosure and producing sensor outputs; and
an electronic controller sensing positioning of the movable plunger and evaluating said sensor outputs.

12. The combination of claim 11 wherein the movable plunger is mounted on a rack and the rack drives the movable plunger through a range of motion from a first movable plunger position at which the movable plunger is fully extended to capture the movable bolt to a second movable plunger position at which the movable plunger is fully retracted and does not engage the movable bolt.

13. The combination of claim 12 further comprising a rack position sensing assembly to sense the rack position throughout said range of motion.

14. The combination of claim 12 wherein the electronic controller determines a fault condition exists when the electronic controller sends a control signal to drive the rack to the first rack position at a first time and the rack position assembly does not detect the rack in an appropriate position within a predetermined time after the first time.

15. The combination of claim 11 further comprising:

a bolt position sensing assembly which senses when the movable bolt is in the first movable bolt position.

16. An electronic lock and enclosure combination comprising:

an electronic lock having a movable plunger, the electronic lock configured to capture a movable bolt in a first position with the movable plunger;

an enclosure enclosing the electronic lock;

a dual purpose movable plunger position sensor assembly sensing both a position of the movable plunger and an effort to tamper with the position of the movable plunger from outside the enclosure and producing sensor outputs; and an electronic controller sensing positioning of the movable plunger and evaluating said sensor outputs, wherein the dual purpose movable plunger position sensor assembly further comprises a light sensor for detecting an inappropriate level of ambient light when the movable plunger has captured the movable bolt.

17. The combination of claim 16 wherein the movable plunger is mounted on a rack and the electronic controller determines a fault condition exists when the movable bolt is in the first movable bolt position, the rack is in a first rack position and when the access door is supposed to be closed, the light sensor senses ambient light exceeding a predetermined amount.

* * * * *